United States Patent
Han et al.

(10) Patent No.: US 11,038,174 B2
(45) Date of Patent: Jun. 15, 2021

(54) METHOD FOR PREPARING IRON OXIDE-HYDROXIDE (FEOOH) AND POSITIVE ELECTRODE FOR LITHIUM-SULFUR BATTERY COMPRISING IRON OXIDE-HYDROXIDE

(71) Applicant: LG CHEM, LTD., Seoul (KR)

(72) Inventors: Suenghoon Han, Daejeon (KR); Kwonnam Sohn, Daejeon (KR); Doo Kyung Yang, Daejeon (KR); Dongwook Lee, Daejeon (KR); Jungmi Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 94 days.

(21) Appl. No.: 16/324,249

(22) PCT Filed: May 28, 2018

(86) PCT No.: PCT/KR2018/006003
§ 371 (c)(1),
(2) Date: Feb. 8, 2019

(87) PCT Pub. No.: WO2018/236060
PCT Pub. Date: Dec. 27, 2018

(65) Prior Publication Data
US 2019/0181449 A1    Jun. 13, 2019

(30) Foreign Application Priority Data

Jun. 20, 2017 (KR) .................. 10-2017-0078017
Jul. 13, 2017 (KR) .................. 10-2017-0089104
May 25, 2018 (KR) .................. 10-2018-0059572

(51) Int. Cl.
*H01M 4/62* (2006.01)
*H01M 10/052* (2010.01)
(Continued)

(52) U.S. Cl.
CPC .............. *H01M 4/62* (2013.01); *C01G 49/02* (2013.01); *H01M 4/364* (2013.01); *H01M 4/38* (2013.01);
(Continued)

(58) Field of Classification Search
CPC ........ H01M 4/62; H01M 4/382; H01M 4/364; H01M 4/583; H01M 4/38
See application file for complete search history.

(56) References Cited

U.S. PATENT DOCUMENTS

2014/0361226 A1* 12/2014 Takada .................. H01M 4/525
                                                                252/506
2018/0138503 A1    5/2018 Kim et al.
2019/0173080 A1*  6/2019 Hwang .................. H01M 4/366

FOREIGN PATENT DOCUMENTS

CN    101485985 A    7/2009
DE    197 55 351 A1  6/1999
(Continued)

OTHER PUBLICATIONS

Machine Translation of JP 2005281128A Aug. 18, 2020 (Year: 2020).*

(Continued)

*Primary Examiner* — Matthew J Merkling
(74) *Attorney, Agent, or Firm* — Birch, Stewart, Kolasch & Birch, LLP

(57) ABSTRACT

A method for preparing Iron Oxide-hydroxide (FeOOH), and a positive electrode for a lithium-sulfur battery including Iron Oxide-hydroxide. In particular, the preparation of crystalline Iron Oxide-hydroxide, particularly, lepidocrocite ($\gamma$-FeOOH), by controlling a reaction time and a reaction temperature, and by using the prepared high purity Iron (Continued)

Oxide-hydroxide in a positive electrode of a lithium-sulfur battery, may enhance discharge capacity and lifetime properties of the battery.

16 Claims, 7 Drawing Sheets

(51) Int. Cl.
  *H01M 4/38* (2006.01)
  *H01M 4/583* (2010.01)
  *H01M 4/36* (2006.01)
  *C01G 49/02* (2006.01)
  *H01M 4/02* (2006.01)

(52) U.S. Cl.
  CPC ........... *H01M 4/382* (2013.01); *H01M 4/583* (2013.01); *H01M 10/052* (2013.01); *C01P 2002/72* (2013.01); *C01P 2002/84* (2013.01); *C01P 2004/03* (2013.01); *C01P 2004/20* (2013.01); *C01P 2004/62* (2013.01); *C01P 2004/64* (2013.01); *C01P 2006/40* (2013.01); *H01M 2004/028* (2013.01)

(56) References Cited

FOREIGN PATENT DOCUMENTS

| JP | 2005-281128 A | 10/2005 |
|----|---------------|---------|
| JP | 2008-176981 A | 7/2008 |
| JP | 5144108 B2 | 2/2013 |
| KR | 10-0270077 B1 | 10/2000 |
| KR | 10-2009-0120058 A | 11/2009 |
| KR | 10-2014-0116397 A | 10/2014 |
| KR | 10-2017-0001374 A | 1/2017 |
| KR | 10-2017-0032190 A | 3/2017 |
| KR | 10-2019-0051448 A | 5/2019 |
| WO | 2017/109014 A1 | 6/2017 |
| WO | WO 2019/107752 A1 | 6/2019 |

OTHER PUBLICATIONS

Machine Translation of JP2008176981A (Year: 2020).*
Extended European Search Report dated Jan. 15, 2020, for European Application No. 18821299.7.
Yin et al., "Lithium-Sulfur Batteries: Electrochemistry, Materials, and Prospects", Angew. Chem. Int. Ed., vol. 52, 2013, pp. 13186-13200.
European Search Report for Appl. No. 18821299.7 dated Sep. 20, 2019.
Agarwal et al., "Synthesis, Characterization and Application of Nano Lepidocrocite and Magnetite in the Degradation of Carbon Tetrachloride", South African Journal of Chemistry, vol. 64, 2011, pp. 218-224.
Bourlinos et al., "One-pot Borohydride Synthesis of Magnetically Modified Lepidocrocite", Chemistry Letters, vol. 34, No. 5, 2005, pp. 666-667.
Castaneda et al., "Synthesis of $Fe_2O_3$ Species Embedded in a Silica Xerogel Matrix: A Comparative Study", Journal of Sol-Gel Science and Technology, vol. 25, 2002, pp. 29-36.
International Search Report issued in PCT/KR2018/006003 (PCT/ISA/210), dated Sep. 7, 2018.
Liu et al., "Hydrothermal synthesis and characterization of $\alpha$-FeOOH and $\alpha$-$Fe_2O_3$ uniform nanocrystallines", Journal of Alloys and Compounds, vol. 433, 2007, pp. 216-220.
Jia et al., "Facile one-pot synthesis of lepidocrocite ($\gamma$-FeOOH) nanoflakes for water treatment", New Journal of Chemistry, vol. 37, 2013, pp. 2551-2556.

* cited by examiner

【Figure 1】(Original)
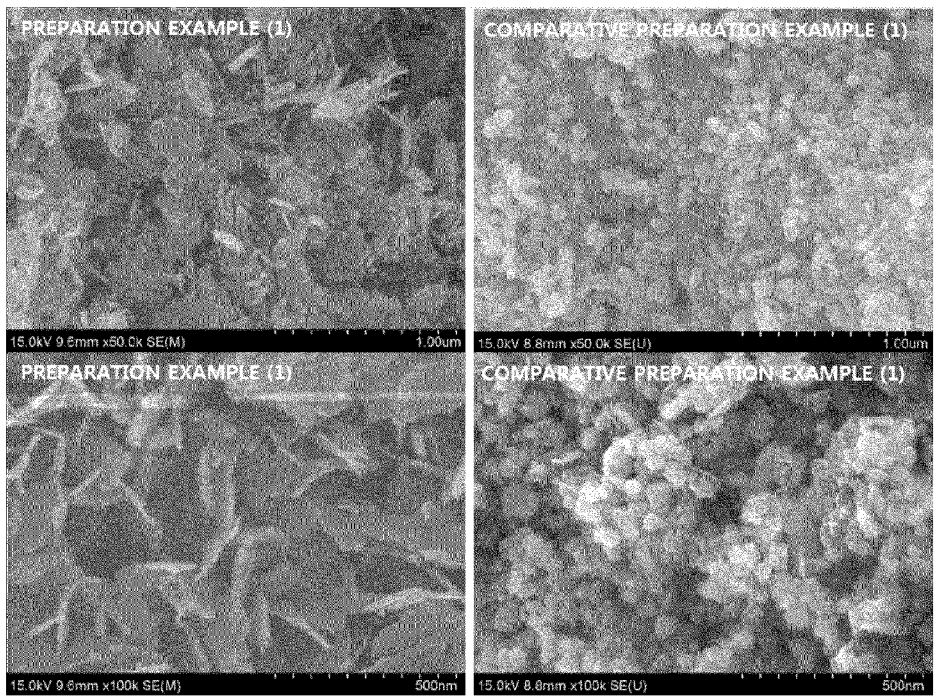
【Figure 2】(Original)
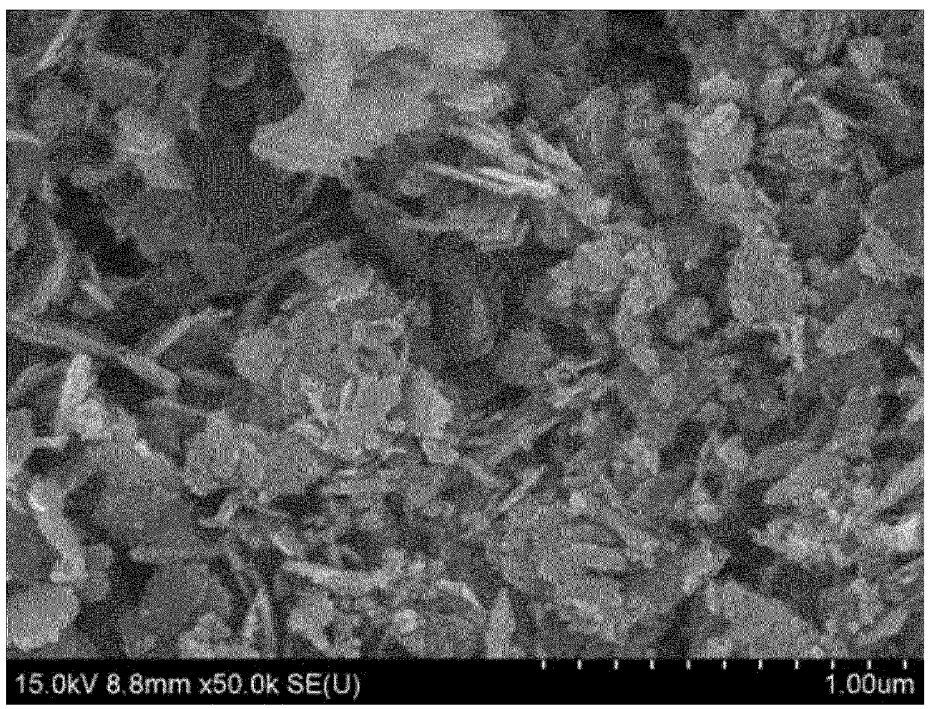

【Figure 3】
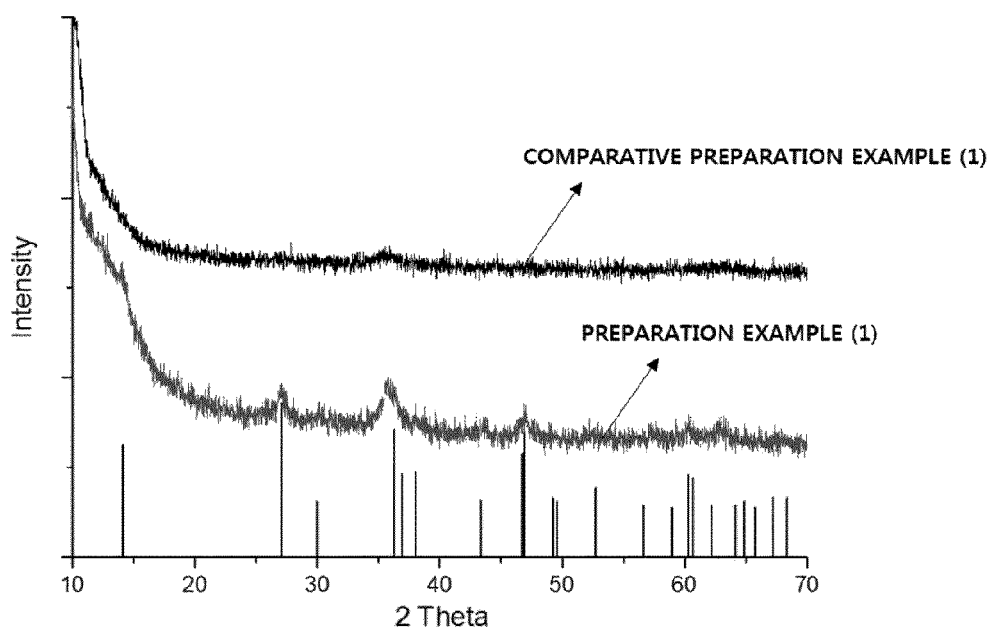
【Figure 4】
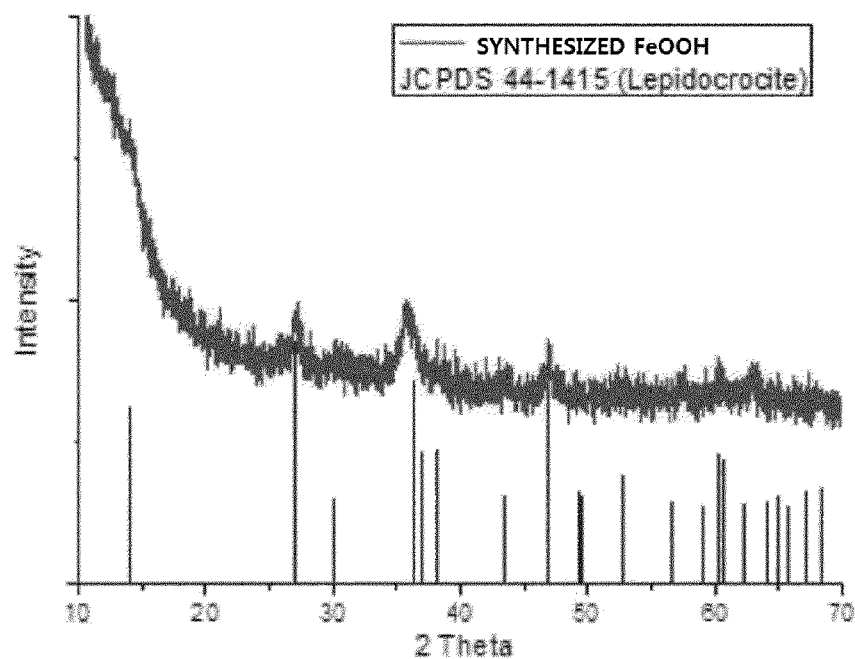

【Figure 5】
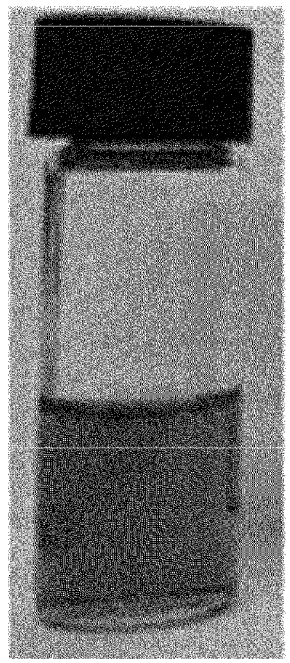 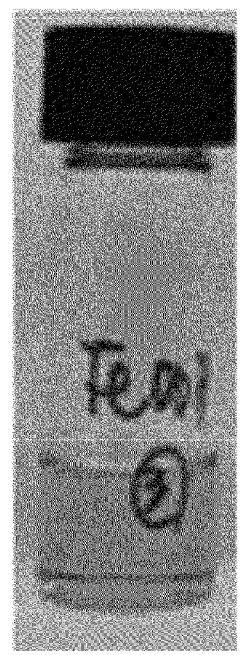

【Figure 6】
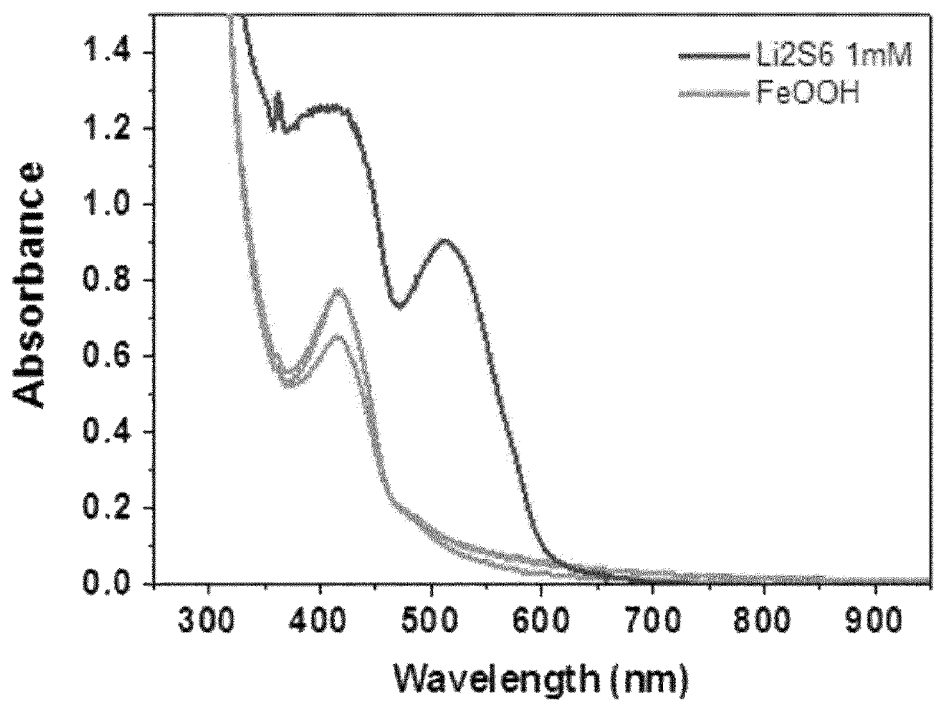
【Figure 7】
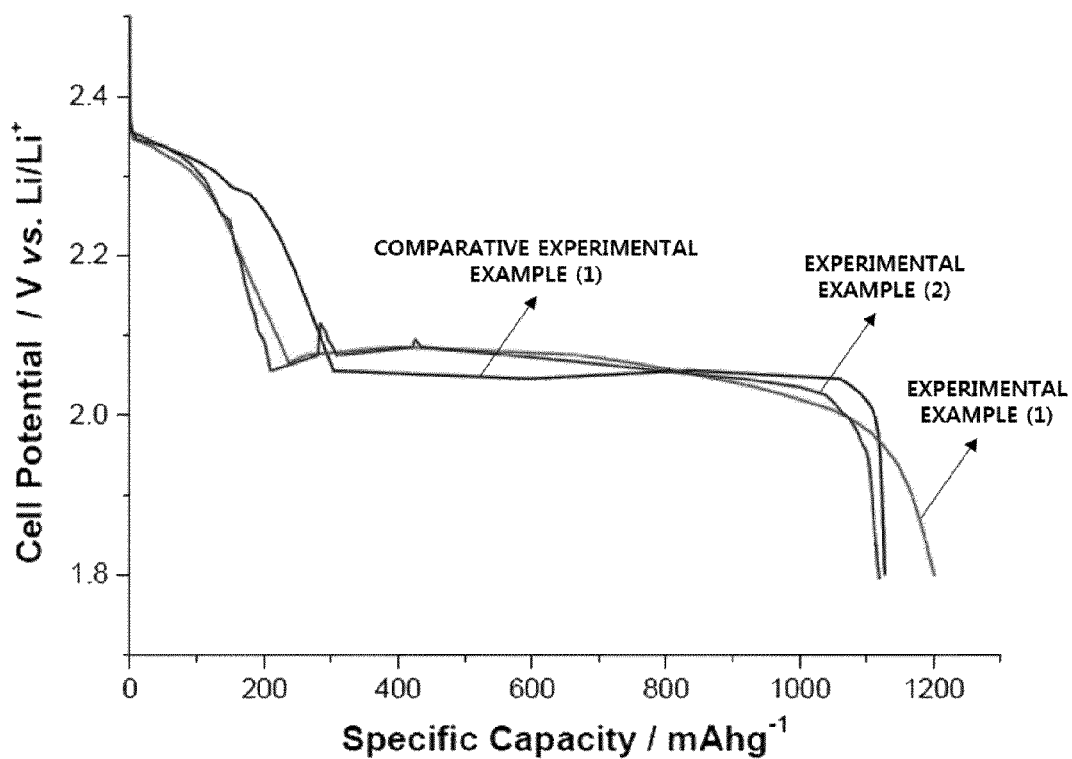

[Figure 8]
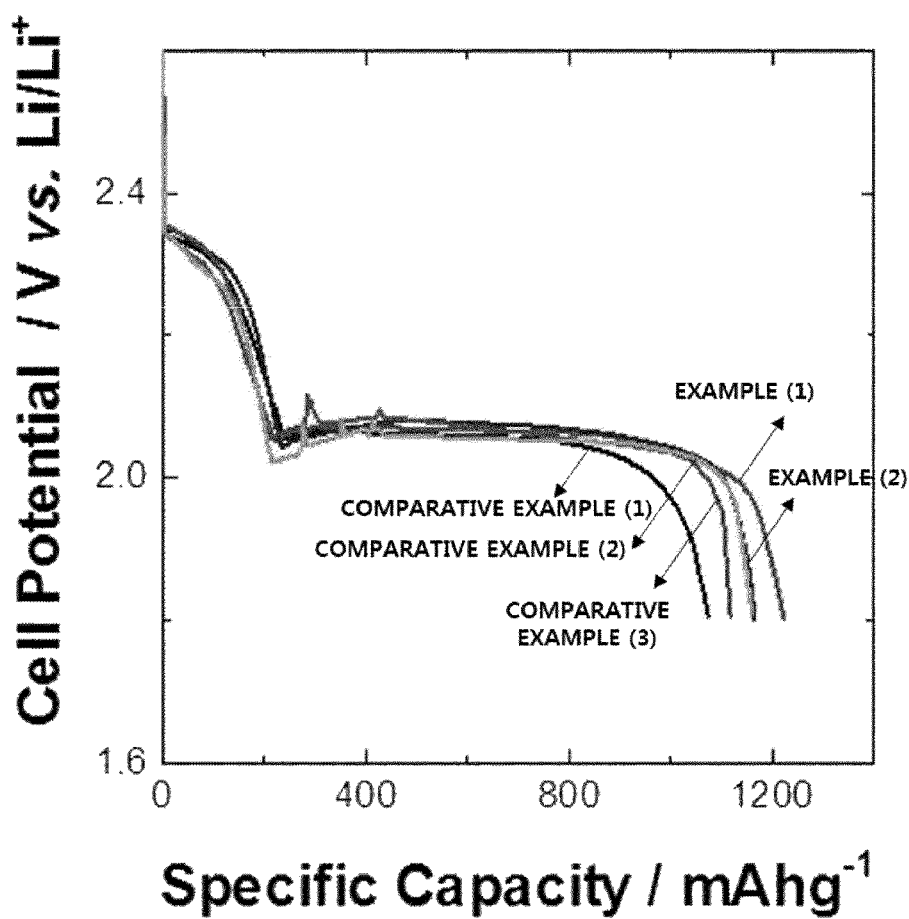

【Figure 9】
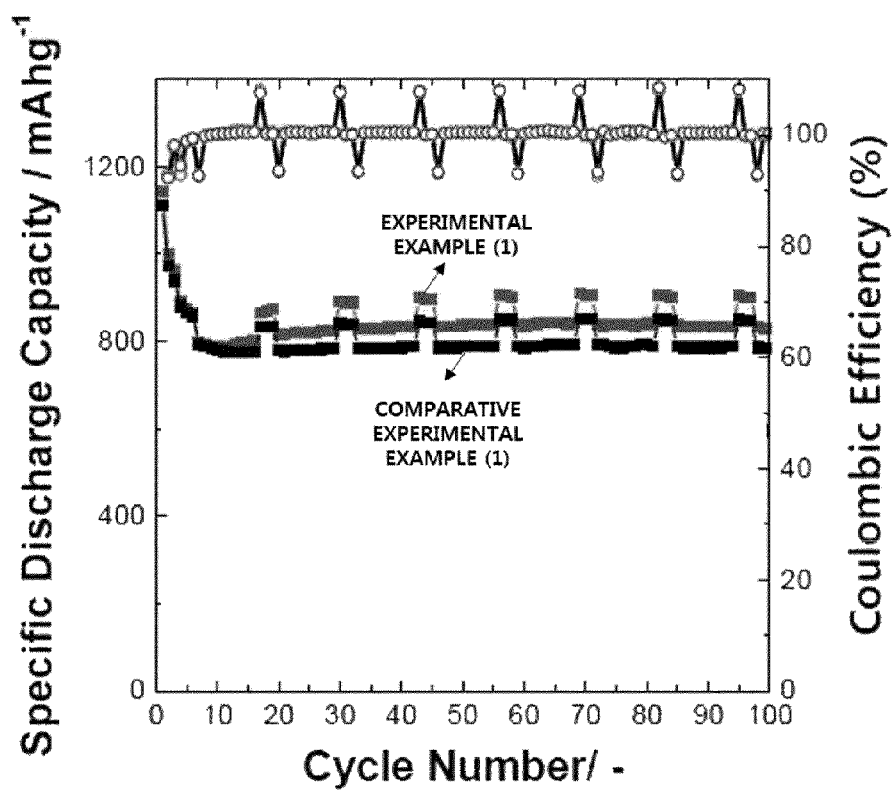

【Figure 10】
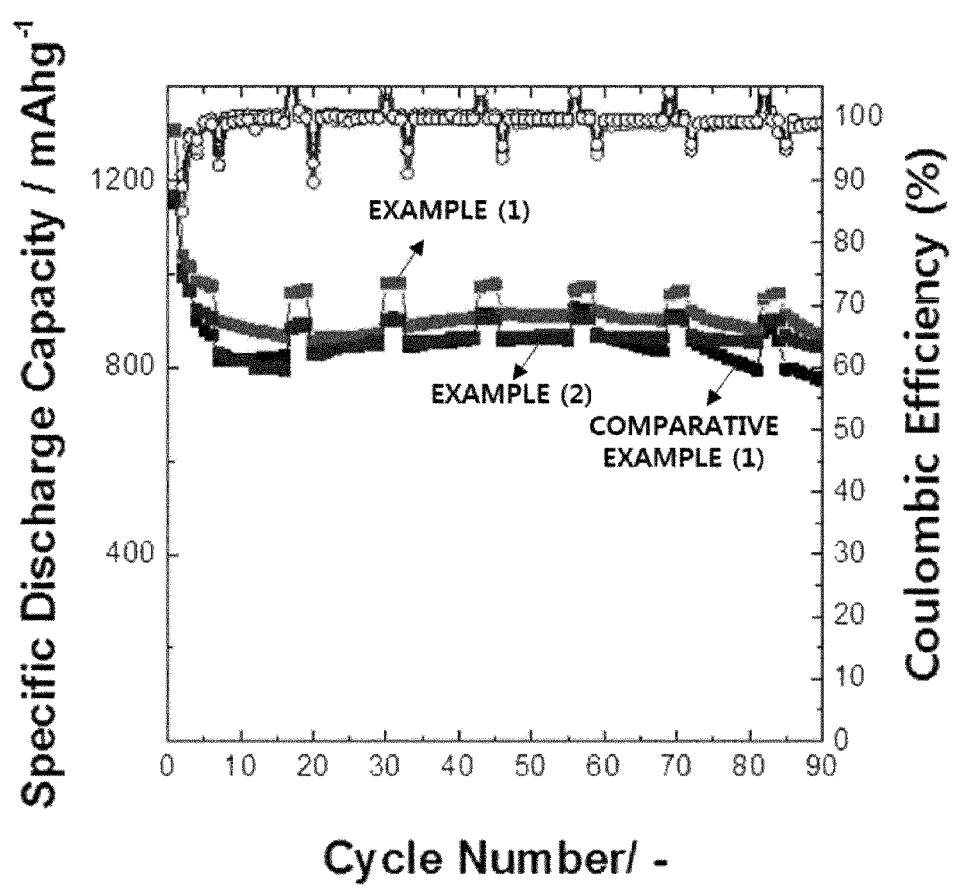

METHOD FOR PREPARING IRON OXIDE-HYDROXIDE (FEOOH) AND POSITIVE ELECTRODE FOR LITHIUM-SULFUR BATTERY COMPRISING IRON OXIDE-HYDROXIDE

TECHNICAL FIELD

This application claims priority to and the benefits of Korean Patent Application No. 10-2017-0078017, filed with the Korean Intellectual Property Office on Jun. 20, 2017, Korean Patent Application No. 10-2017-0089104, filed with the Korean Intellectual Property Office on Jul. 13, 2017, and Korean Patent Application No. 10-2018-0059572, filed with the Korean Intellectual Property Office on May 25, 2018, the entire contents of which are incorporated herein by reference.

The present invention relates to a method for preparing Iron Oxide-hydroxide (FeOOH) capable of being used as a positive electrode additive for a lithium-sulfur battery, a positive electrode for a lithium-sulfur battery comprising Iron Oxide-hydroxide (FeOOH) as a positive electrode additive, and a lithium-sulfur battery provided therewith and thereby having increased discharge capacity and improved battery lifetime.

BACKGROUND ART

Unlike primary batteries that are discharged only once, secondary batteries are an electricity storage device capable of continuous charge and discharge, and have become an important electronic component of portable electronic devices since 1990s. Particularly, since their commercialization by Sony Corporation of Japan in 1992, lithium ion secondary batteries have led the information age as a core component of portable electronic devices such as smart phones, digital cameras and notebook computers.

Recently, with lithium ion secondary batteries further expanding their areas of application, demands thereon have rapidly increased from medium batteries to be used in power supplies of cleaners or power tools and in the fields such as electric bicycles and electric scooters to high capacity batteries used in the fields such as electric vehicles (EV), hybrid electric vehicles (HEV), plug-in hybrid electric vehicles (PHEV), various robots and large electric storage systems (ESS).

However, lithium secondary batteries having most superior properties among secondary batteries available so far also have several problems to be actively used in transportation equipment such as electric vehicles or PHEV, and a biggest problem among these is limitation in the capacity.

A lithium secondary battery is basically formed with materials such as a positive electrode, an electrolyte and a negative electrode, and since positive electrode and negative electrode materials among these determine battery capacity, a lithium ion secondary battery is subject to restrictions in the capacity due to limits in the positive electrode and negative electrode materials. Particularly, secondary batteries to be used in the applications such as electric vehicles and PHEV need to be used as long as possible after charged once, and discharge capacity becomes very important in secondary batteries. One of the biggest limitations in the sale of electric vehicles is that a distance to travel after charged once is much shorter than automobiles with conventional gasoline engines.

Despite much efforts, such capacity limitation in lithium secondary batteries is difficult to completely resolve due to limitations in lithium secondary battery structures and materials. Accordingly, development of a new concept secondary battery that goes beyond existing secondary battery concepts is required in order to fundamentally resolve the capacity problem of lithium secondary batteries.

A lithium-sulfur battery is a new high capacity and low-priced battery system overcoming the capacity limit determined by intercalation/deintercalation reactions of lithium ions to layer-structured metal oxide and graphite, a basic principle of existing lithium ion secondary batteries, and capable of bringing transition metal replacement and cost reduction.

A lithium-sulfur battery may achieve a super high capacity battery system by having theoretical capacity obtained from a conversion reaction of lithium ions and sulfur ($S_8$+ $16Li^+ + 16e^- \rightarrow 8Li_2S$) in a positive electrode reaching 1,675 mAh/g, and using lithium metal (theoretical capacity: 3,860 mAh/g) as a negative electrode. In addition, a discharge voltage is approximately 2.2 V, and therefore, energy density of 2,600 Wh/kg is obtained theoretically based on the amounts of positive electrode and negative electrode active materials. This is a value higher by approximately 6 to 7 times compared to 400 Wh/kg, theoretical energy density of commercialized lithium secondary batteries ($LiCoO_2$/graphite) using layer-structured metal oxide and graphite.

A lithium-sulfur battery has received attention as a new high-capacity, environmental-friendly, and low-priced lithium secondary battery after it is known around 2010 that battery performance may be dramatically improved through forming a nanocomposite, and intensive studies thereon have been conducted globally as a next generation battery system.

One of major problems of a lithium-sulfur battery revealed to date is that sulfur is close to a nonconductor with electrical conductivity of approximately $5.0 \times 10^{-14}$ S/cm, and an electrochemical reaction is not readily carried out in an electrode, and actual discharge capacity and voltage are far below theory due to a very large overvoltage. Early researchers have tried to improve performance using methods such as mechanical ball milling of sulfur and carbon or surface coating using carbon, however, there have been no significant effects.

In order to effectively resolve a problem of an electrochemical reaction being limited due to electrical conductivity, particle sizes need to be reduced to several tens of nanometers or less and the surface needs to be treated with a conductive material as in the example of $LiFePO_4$ (electrical conductivity: $10^{-9}$ S/cm to $10^{-10}$ S/cm), one of other positive electrode active materials, and for this, many chemical (melt impregnation into nano-sized porous carbon nanostructures or metal oxide structures), physical methods (high energy ball milling) and the like have been reported.

Another major problem relating to a lithium-sulfur battery is dissolution of lithium polysulfide, an intermediate product of sulfur, in an electrolyte. As discharge progresses, sulfur ($S_8$) continuously reacts with lithium ions and a phase thereof continuously changes like $S_8 \rightarrow Li_2S_8 \rightarrow (Li_2S_6) \rightarrow Li_2S_4 \rightarrow Li_2S_2 \rightarrow Li_2S$ and the like, and among these, $Li_2S_8$ or $Li_2S_4$ (lithium polysulfide) having a chain shape with sulfur forming a long line tends to be readily dissolved in general electrolytes used in lithium ion batteries. When such a reaction occurs, not only reversible positive electrode capacity is greatly reduced but also dissolved lithium polysulfide is diffused into a negative electrode causing various side reactions.

Particularly, lithium polysulfide causes a shuttle reaction during charge and discharge processes, and charge and discharge efficiency rapidly decreases therefrom since charge capacity continuously increases. Various methods have been recently proposed in order to resolve such a problem, and the methods may be largely divided into a method of improving an electrolyte, a method of improving a negative electrode surface, and a method of improving positive electrode properties.

The method of improving an electrolyte is a method of suppressing a shuttle reaction to the maximum by suppressing dissolution of polysulfide in an electrolyte using a new electrolyte such as a functional liquid electrolyte, a polymer electrolyte or an ionic liquid having a new composition or controlling a rate of dispersion into a negative electrode through adjusting viscosity and the like.

Studies on controlling a shuttle reaction by improving properties of an SEI formed on a negative electrode surface have been actively conducted, and typically, a method of improving by adding an electrolyte additive such as $LiNO_3$ to form an oxide layer such as $Li_xNO_y$ or $Li_xSO_y$ on a lithium negative electrode surface, a method of forming a thick functional SEI layer on a lithium metal surface, and the like, may be included.

Lastly, the method of improving positive electrode properties may include a method of forming a coating layer on a positive electrode particle surface so as to prevent polysulfide dissolution or a method of adding a porous material capable of capturing dissolved polysulfide, and typically, a method of coating a surface of a positive electrode structure including sulfur particles with a conductive polymer, a method of coating a surface of a positive electrode structure with a lithium ion-conducting metal oxide, a method of adding a porous metal oxide having a large specific surface area and large pores capable of absorbing lithium polysulfide in large quantities to a positive electrode, a method of attaching a functional group capable of adsorbing lithium polysulfide on a carbon structure surface, a method of surrounding sulfur particles using graphene, graphene oxide or the like, and the like, have been proposed.

Despite such efforts that are in progress, there are problems in that such methods are somewhat complicated and the amount of introducible sulfur, an active material, is limited. Accordingly, development of new technologies for resolving such problems multiply, and improving lithium-sulfur battery performance has been required.

PRIOR ART DOCUMENTS

Patent Documents (Patent Document 1) Korean Patent No. 10-1996-0065174 (2000.7.27), "Method for Preparing Lepidocrocite" (Patent Document 2) Korean Patent Publication No. 10-2015-0091280 (2017.1.4), "Lithium Sulfur Battery and Method for Manufacturing the Same"

DISCLOSURE

Technical Problem

In view of the above, the inventors of the present invention have predicted that battery performance may be most directly enhanced when improving positive electrode properties of a lithium-sulfur battery, and as a result of extensive studies from this perspective, have identified that lithium polysulfide (LiPS) may be adsorbed by introducing Iron Oxide-hydroxide (FeOOH) to a positive electrode of a lithium-sulfur battery, and have completed the present invention.

For this, the inventors of the present invention have identified that Iron Oxide-hydroxide (FeOOH), particularly, crystalline lepidocrocite (γ-FeOOH), may be selectively prepared in high purity by, while reacting $NaBH_4$ with $Fe(NO_3)_3·9H_2O$ or $FeCl_3·6H_2O$ in an aqueous solution state with a proper concentration, controlling a reaction time and a reaction temperature.

Accordingly, an aspect of the present invention provides a method for preparing high purity Iron Oxide-hydroxide through a simple process.

Another aspect of the present invention is to contribute to an increase in the discharge capacity of a lithium-sulfur battery and increase a lifetime of the lithium-sulfur battery by increasing positive electrode reactivity through adsorbing lithium polysulfide.

Technical Solution

According to an aspect of the present invention, there is provided a method for preparing Iron Oxide-hydroxide (FeOOH) including mixing and reacting $Fe(NO_3)_3·9H_2O$ or $FeCl_3·6H_2O$; and a reducing agent represented by the following Chemical Formula 1.

  [Chemical Formula 1]

In Chemical Formula 1, $M^1$ is any one selected from among Li, Na, Mg, K and Ca, and X is 1 or 2.

In one specific embodiment of the present invention, the $Fe(NO_3)_3·9H_2O$ or the $FeCl_3·6H_2O$ is present as an aqueous solution having a concentration of 0.04 M to 0.08 M.

In one specific embodiment of the present invention, the reducing agent represented by Chemical Formula 1 is present as an aqueous solution having a concentration of 0.2 M to 0.5 M.

In one specific embodiment of the present invention, the mixing is carried out for 10 seconds to 120 seconds.

In one specific embodiment of the present invention, the reacting is carried out at a temperature of from 20° C. to 25° C.

In one specific embodiment of the present invention, the reaction time is from 10 minutes to 10 hours.

In one specific embodiment of the present invention, the reaction time is from 40 minutes to 2 hours.

In one specific embodiment of the present invention, filtering and drying are further included after the reacting.

In one specific embodiment of the present invention, the drying is carried out for 6 hours to 12 hours at 70° C. to 90° C.

In one specific embodiment of the present invention, the Iron Oxide-hydroxide (FeOOH) is lepidocrocite (γ-FeOOH).

In one specific embodiment of the present invention, the Iron Oxide-hydroxide (FeOOH) is crystalline.

In one specific embodiment of the present invention, the Iron Oxide-hydroxide (FeOOH) is a plate-type.

In one specific embodiment of the present invention, the Iron Oxide-hydroxide (FeOOH) has a particle diameter of 50 nm to 500 nm.

According to another aspect of the present invention, there is provided a positive electrode for a lithium-sulfur battery including an active material, a conductor and a binder, wherein the positive electrode includes Iron Oxide-hydroxide (FeOOH).

In one specific embodiment of the present invention, the Iron Oxide-hydroxide (FeOOH) is lepidocrocite (γ-FeOOH).

In one specific embodiment of the present invention, the Iron Oxide-hydroxide (FeOOH) is crystalline.

In one specific embodiment of the present invention, the Iron Oxide-hydroxide (FeOOH) has XRD peaks of (200), (210), (301) and (020) surfaces appearing at 2θ=14.1±0.1°, 27.0±0.1°, 36.3±0.1° and 46.9±0.1°, respectively.

In one specific embodiment of the present invention, the Iron Oxide-hydroxide (FeOOH) is a plate-type.

In one specific embodiment of the present invention, the Iron Oxide-hydroxide (FeOOH) has an average particle diameter of 50 nm to 500 nm.

In one specific embodiment of the present invention, the positive electrode for a lithium-sulfur battery includes the Iron Oxide-hydroxide (FeOOH) in 0.1 parts by weight to 15 parts by weight with respect to 100 parts by weight of a base solid.

In one specific embodiment of the present invention, the active material is a sulfur-carbon composite.

According to still another aspect of the present invention, there is provided a lithium-sulfur battery including a positive electrode, a negative electrode, and a separator and an electrolyte provided therebetween, wherein the positive electrode is the positive electrode for a lithium-sulfur battery described above.

Advantageous Effects

According to the present invention, high purity Iron Oxide-hydroxide (FeOOH) can be prepared using a simple process including reacting $NaBH_4$ and $Fe(NO_3)_3 \cdot 9H_2O$ or $FeCl_3 \cdot 6H_2O$.

Shapes and purity of the prepared Iron Oxide-hydroxide (FeOOH) can be controlled just by adjusting a reaction temperature and a reaction time when reacting the $NaBH_4$ and the $Fe(NO_3)_3 \cdot 9H_2O$ or the $FeCl_3 \cdot 6H_2O$.

As a result, the present invention can selectively prepare, among Iron Oxide-hydroxides, lepidocrocite (γ-FeOOH) that is crystalline. In addition, when using Iron Oxide-hydroxide (FeOOH) in a positive electrode of a lithium-sulfur battery, lithium polysulfide produced during charge and discharge is adsorbed to increase reactivity of the positive electrode of the lithium-sulfur battery, and the lithium-sulfur battery using the same can exhibit an effect of increasing discharge capacity and lifetime.

DESCRIPTION OF DRAWINGS

FIG. 1 presents scanning electron microscope (SEM) images of Iron Oxide-hydroxide (FeOOH) according to a preparation example and a comparative preparation example of the present invention.

FIG. 2 presents a scanning electron microscope (SEM) image of Iron Oxide-hydroxide (FeOOH) according to a preparation example of the present invention.

FIG. 3 presents X-ray diffraction (XRD) analysis results of Iron Oxide-hydroxide (FeOOH) according to a preparation example and a comparative preparation example of the present invention.

FIG. 4 presents an X-ray diffraction (XRD) analysis result of Iron Oxide-hydroxide (FeOOH) according to a preparation example of the present invention.

FIG. 5 presents color changes in Iron Oxide-hydroxide (FeOOH) according to the present invention obtained in a lithium polysulfide adsorption experiment.

FIG. 6 presents changes in the chromaticity of a lithium polysulfide($Li_2S_6$) adsorption reaction of Iron Oxide-hydroxide (FeOOH) according to the present invention as a result of UV absorbance measurement.

FIG. 7 presents results of measuring discharge capacity of a lithium-sulfur battery including a positive electrode according to experimental examples and a comparative experimental example of the present invention.

FIG. 8 presents results of measuring discharge capacity of a lithium-sulfur battery including a positive electrode according to examples and comparative examples of the present invention.

FIG. 9 presents results of measuring a lifetime of a lithium-sulfur battery including a positive electrode according to an experimental example and a comparative experimental example of the present invention.

FIG. 10 presents results of measuring a lifetime of a lithium-sulfur battery including a positive electrode according to examples and a comparative example of the present invention.

BEST MODE

Embodiments of the present invention will be described in detail with reference to accompanying drawings so that those skilled in the art may readily implement the present invention. However, the present invention may be embodied in various different forms, and is not limited to the present specification.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

A term "composite" used in the present specification means a substance combining two or more materials and exhibiting more effective function while forming phases physically and chemically different from each other.

Method for Preparing Iron Oxide-Hydroxide (FeOOH)

The present invention relates to a method for preparing Iron Oxide-hydroxide (FeOOH), and relates to a method capable of preparing Iron Oxide-hydroxide (FeOOH) having shapes and properties capable of enhancing discharge capacity by being used as a positive electrode material of a lithium-sulfur battery.

The method for preparing Iron Oxide-hydroxide (FeOOH) according to the present invention may include mixing and reacting $Fe(NO_3)_3 \cdot 9H_2O$ or $FeCl_3 \cdot 6H_2O$; and a reducing agent represented by the following Chemical Formula 1:

$M^1(BH_4)_X$         [Chemical Formula 1]

in Chemical Formula 1, $M^1$ is any one selected from among Li, Na, Mg, K and Ca, and X is 1 or 2.

Herein, the $Fe(NO_3)_3 \cdot 9H_2O$ or the $FeCl_3 \cdot 6H_2O$ and the reducing agent represented by Chemical Formula 1 may all have an aqueous solution form, and the aqueous $Fe(NO_3)_3 \cdot 9H_2O$ solution or the aqueous $FeCl_3 \cdot 6H_2O$ solution may be added and mixed to the aqueous solution of the reducing agent represented by Chemical Formula 1 to be reacted.

When the mixing and reacting progresses in a reversed way, purity of the prepared Iron Oxide-hydroxide (FeOOH) may decline. In other words, when the aqueous solution of the reducing agent represented by Chemical Formula 1 is added and mixed to the aqueous $Fe(NO_3)_3 \cdot 9H_2O$ solution or the aqueous $FeCl_3 \cdot 6H_2O$ solution to be reacted, purity of the prepared Iron Oxide-hydroxide (FeOOH) may decline.

The aqueous $Fe(NO_3)_3 \cdot 9H_2O$ solution or the aqueous $FeCl_3 \cdot 6H_2O$ solution may be in 0.04 M to 0.08 M and preferably in 0.05 M to 0.06 M. When in less than 0.04 M, a preparation yield of the Iron Oxide-hydroxide (FeOOH) may decrease, and when in greater than 0.08 M, properties of the prepared Iron Oxide-hydroxide (FeOOH) may not be suited to be used as a positive electrode material of a lithium-sulfur battery.

The aqueous solution of the reducing agent represented by Chemical Formula 1 may be in 0.2 M to 0.5 M and preferably in 0.3 M to 0.4 M. When in less than 0.2 M, Iron Oxide-hydroxide (FeOOH) may not be prepared, and when in greater than 0.5 M, the reaction may not be progressed.

According to one preferred embodiment of the present invention, the additive represented by Chemical Formula 1 may be $NaBH_4$.

When reacting the aqueous $Fe(NO_3)_3 \cdot 9H_2O$ solution or the $FeCl_3 \cdot 6H_2O$ with the aqueous $NaBH_4$ solution, Iron Oxide-hydroxide (FeOOH) may be naturally synthesized in an aqueous solution phase after $Fe^{3+}$ cations are converted to a Fe metal form.

The mixing of the $Fe(NO_3)_3 \cdot 9H_2O$ or the $FeCl_3 \cdot 6H_2O$ and the reducing agent represented by Chemical Formula 1 may be carried out in a short period of time, and may be carried out for 10 seconds to 120 seconds, and preferably for 50 seconds to 80 seconds. When the mixing time is shorter than 10 seconds, the mixing is carried out too fast generating gases at once making the reaction progress non-uniformly, and when the time is longer than 120 seconds, the mixing rate is low, and materials produced at the beginning of the reaction and materials produced in the latter part of the reaction may have different phases.

In addition, the reaction temperature may be from 10° C. to 60° C., preferably from 20° C. to 50° C. and more preferably from 20° C. to 25° C. When the reaction temperature is lower than 10° C., the reaction may not be progressed, and when higher than 60° C., properties of the prepared Iron Oxide-hydroxide (FeOOH) may change. In addition, the reaction is preferably carried at while maintaining the temperature at 20° C. to 25° C. in order to adjust the reaction rate.

In addition, the reaction time may be from 10 minutes to 10 hours and preferably from 40 minutes to 2 hours. When the reaction time is shorter than 10 minutes, Iron Oxide-hydroxide (FeOOH) may not be formed, and when the reaction time is longer than 20 hours, the Iron Oxide-hydroxide (FeOOH) shape may not be suited as a positive electrode material of a lithium-sulfur battery, and particularly, when reacting for 40 minutes to 2 hours, Iron Oxide-hydroxide (FeOOH) may be retained without losing target properties.

Meanwhile, after the reacting of the aqueous $Fe(NO_3)_3 \cdot 9H_2O$ or $FeCl_3 \cdot 6H_2O$ solution and the aqueous solution of the additive represented by Chemical Formula 1, filtering and drying may be further included.

The filtering may be carried out using filtering processes commonly used in the art, and for example, a filter paper may be used.

The drying may be carried out for 6 hours to 12 hours at 70° C. to 90° C.

When the drying temperature is lower than 70° C. or the drying time is shorter than 6 hours, the drying is not complete and particle-type Iron Oxide-hydroxide (FeOOH) may not be obtained, and when the drying temperature is higher than 90° C. or the drying time is longer than 12 hours, remaining water boils changing Iron Oxide-hydroxide (FeOOH) properties.

The Iron Oxide-hydroxide (FeOOH) prepared using the method as described above may be crystalline, and specifically, may be lepidocrocite (γ-FeOOH).

The prepared Iron Oxide-hydroxide (FeOOH) may be a plate-type, and this may be advantageous in enhancing discharge capacity when used as a positive electrode material of a lithium-sulfur battery. However, the shape of the prepared Iron Oxide-hydroxide (FeOOH) may be adjusted as necessary by controlling the reaction time, and these may all be used as a positive electrode material of a lithium-sulfur battery.

In addition, the prepared Iron Oxide-hydroxide (FeOOH) may be a particle type having a particle diameter of greater than 0 nm and less than or equal to 500 nm, and preferably 50 nm to 500 nm. As the particle diameter decreases within the above-mentioned range, the prepared Iron Oxide-hydroxide (FeOOH) is suited as a positive electrode material of a lithium-sulfur battery, and when the particle diameter is greater than the above-mentioned range, the particle sizes are large, which is not suited as a positive electrode material of a lithium-sulfur battery.

When using Iron Oxide-hydroxide (FeOOH) prepared using the method for preparing Iron Oxide-hydroxide (FeOOH) as described above, for example, crystalline lepidocrocite (γ-FeOOH), in a lithium-sulfur battery, polysulfide eluted when charging and discharging a lithium-sulfur battery may be adsorbed, and lithium-sulfur battery performance may be enhanced therefrom.

The method for preparing Iron Oxide-hydroxide (FeOOH) according to the present invention may selectively prepare crystalline lepidocrocite (γ-FeOOH) among Iron Oxide-hydroxides (FeOOH), and therefore, is suited as a technology supplying a positive electrode material of a lithium-sulfur battery.

FIG. 1 and FIG. 2 present scanning electron microscope (SEM) images of lepidocrocite (γ-FeOOH), Iron Oxide-hydroxide (FeOOH) prepared using the above-mentioned preparation method. As identified from the drawings, preparation of the 'plate-type' Iron Oxide-hydroxide (FeOOH) prepared according to one embodiment may be identified, and the Iron Oxide-hydroxide (FeOOH) prepared using the method may have an average particle diameter of 50 nm to 500 nm, and may have a plate-type structure.

FIG. 4 presents a result of X-ray diffraction (XRD) analysis data of lepidocrocite (γ-FeOOH), Iron Oxide-hydroxide (FeOOH) prepared using the above-mentioned preparation method. As a result of X-ray diffraction analysis using a CuKα line of FIG. 4, XRD peaks of (200), (210), (301) and (020) surfaces appear at 2θ=14.1±0.1°, 27.0±0.1°, 36.3±0.1° and 46.9±0.1°, respectively. Synthesis of Iron Oxide-hydroxide (FeOOH) may be identified through an effective peak detection of FIG. 4.

The effective (significant) peak in the X-ray diffraction (XRD) analysis means a peak repeatedly detected in substantially the same pattern without being largely affected by analysis conditions or analysts in the XRD data, and in other words, means a peak having height, intensity, strength and the like of 1.5 times or greater, preferably 2 times or greater and more preferably 2.5 times or greater compared to a background level.

Positive Electrode for Lithium-Sulfur Battery

The present invention provides a positive electrode for a lithium-sulfur battery including an active material, a conductor and a binder, wherein the positive electrode includes Iron Oxide-hydroxide (FeOOH).

Herein, the positive electrode of a lithium-sulfur battery may have a base solid including an active material, a conductor and a binder placed on a current collector.

As the current collector, aluminum, nickel or the like having excellent conductivity may be preferred.

As one embodiment, Iron Oxide-hydroxide (FeOOH) may be included in 0.1 parts by weight to 15 parts by weight and preferably in 1 parts by weight to 10 parts by weight based on 100 parts by weight of the based solid including an active material, a conductor and a binder. When the value is less than the lower limit of the above-mentioned numerical range, a polysulfide adsorption effect may be insignificant, and when the value is greater than the upper limit, electrode capacity decreases, which is not preferred.

As the Iron Oxide-hydroxide (FeOOH), the Iron Oxide-hydroxide (FeOOH) prepared using the preparation method provided in the present invention may be used, and preferably, lepidocrocite (γ-FeOOH) may be used. The Iron Oxide-hydroxide (FeOOH) may be crystalline, and may be a plate-type having an average particle diameter of 50 nm to 500 nm.

Meanwhile, as the active material in the base solid forming the positive electrode of the present invention, elemental sulfur ($S_8$), sulfur series compounds or mixtures thereof may be included, and specific examples of the sulfur series compound may include $Li_2S_n$ (n≥1), organosulfur compounds, carbon-sulfur composites (($C_2S_x$)$_n$: x=2.5 to 50, n≥2) or the like.

The positive electrode for a lithium-sulfur battery according to the present invention may preferably include an active material of the sulfur-carbon composite, and since a sulfur material alone does not have electrical conductivity, it may be composited with a conductor when used. Adding the Iron Oxide-hydroxide (FeOOH) according to the present invention does not affect such sulfur-carbon composite structure retention.

The active material is preferably employed to form 50 parts by weight to 95 parts by weight and more preferably around 70 parts by weight in 100 parts by weight of the base solid. When the active material is included in less than the above-mentioned range, the electrode reaction is difficult to sufficiently obtain, and when included in greater than the above-mentioned range, a sufficient electrode reaction is difficult to exhibit since amounts of other conductor and binder included are relatively insufficient, and therefore, a proper content is preferably determined within the above-mentioned range.

The conductor in the base solid forming the positive electrode of the present invention is a material performing a role of a path for electrons migrating from a current collector to sulfur by electrically connecting an electrolyte and a positive electrode active material, and is not particularly limited as long as it has porosity and conductivity without inducing chemical changes to a battery. For example, graphite-based materials such as KS6; carbon black such as Super-P, carbon black, denka black, acetylene black, ketjen black, channel black, furnace black, lamp black or thermal black; carbon derivatives such as fullerene; conductive fibers such as carbon fibers or metal fibers; fluorocarbon, aluminum, metal powders such as nickel powder; or conductive polymers such as polyaniline, polythiophene, polyacetylene or polypyrrole may be used either alone or as a mixture.

The conductor is preferably employed to form 1 parts by weight to 10 parts by weight and preferably around 5 parts by weight in 100 parts by weight of the base solid. When the conductor content included in the electrode is less than the above-mentioned range, parts of the sulfur that may not react increase in the electrode ultimately causing a decrease in the capacity, and the content being greater than the above-mentioned range adversely affects high efficiency discharge properties and charge and discharge cycle lifetime, and therefore, a proper content is preferably determined with the above-described range.

The binder as the base solid is a material included for favorably attaching a slurry composition of the base solid forming the positive electrode on a current collector, and materials favorably dissolved in a solvent and favorably forming a conducting network with the positive electrode active material and the conductor are used. Unless particularly limited, all binders known in the art may be used, and preferably, poly(vinyl)acetate, polyvinyl alcohol, polyethylene oxide, polyvinyl pyrrolidone, alkylated polyethylene oxide, crosslinked polyethylene oxide, polyvinyl ether, poly (methyl methacrylate), polyvinylidene fluoride (PVdF), polyhexafluoropropylene, a polyvinylidene fluoride copolymer (product name: Kynar), poly(ethyl acrylate), polytetrafluoroethylene polyvinyl chloride, polytetrafluoroethylene, polyacrylonitrile, polyvinylpyridine, polystyrene, carboxymethylcellulose, siloxane-based such as polydimethylsiloxane, rubber-based binders including styrene-butadiene rubber, acrylonitrile-butadiene rubber and styrene-isporene rubber, ethylene glycol-based such as polyethylene glycol diacrylate, and derivatives thereof, blends thereof, copolymers thereof and the like may be used. However, the binder is not limited thereto.

The binder is preferably employed to form 1 parts by weight to 10 parts by weight and preferably around 5 parts by weight in 100 parts by weight of the base composition included in the electrode. When the binder content is less than the above-mentioned range, physical properties of the positive electrode decline causing detachment of the active material and the conductor, and when the content is greater than the above-mentioned range, the ratios of the active material and the conductor relatively decrease in the positive electrode causing a decrease in the battery capacity, and therefore, a proper content is preferably determined in the above-described range.

As described above, the positive electrode including Iron Oxide-hydroxide (FeOOH) and the base solid may be prepared using common methods.

For example, when preparing the positive electrode slurry, Iron Oxide-hydroxide (FeOOH) is dispersed into a solvent first, and the obtained solution is mixed with an active material, a conductor and a binder to obtain a slurry composition for forming a positive electrode. After that, such a slurry composition is coated on a current collector, and the result is dried to complete a positive electrode. Herein, as necessary, extrusion molding may be carried out on the current collector in the preparation for enhancing electrode density.

Herein, as the solvent, those capable of readily dissolving Iron Oxide-hydroxide (FeOOH) as well as uniformly dispersing the positive electrode active material, the binder and the conductor may be used. As such a solvent, water is most preferred as an aqueous solvent, and herein, the water may be secondary distilled DW (distilled water) or tertiary distilled DIW (deionized Water). However, the solvent is not limited thereto, and lower alcohols capable of being readily mixed with water may be used as necessary. Examples of the lower alcohol may include methanol, ethanol, propanol, isopropanol and butanol, and preferably, these may be mixed with water when used.

Lithium-Sulfur Battery

Meanwhile, the present invention provides a lithium-sulfur battery including a positive electrode, a negative electrode, a separator and an electrolyte provided therebetween, wherein the positive electrode is the positive electrode described above.

Herein, the negative electrode, the separator and the electrolyte may be formed with material that may be commonly used in a lithium-sulfur battery.

Specifically, the negative electrode may use a material capable of reversibly intercalating or deintercalating lithium ions ($Li^+$), a material capable of reversibly forming a lithium-containing compound by reacting with lithium ions, lithium metal or a lithium alloy as an active material.

Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions may include tin oxide, titanium nitrate or silicon. Examples of the lithium alloy may include alloys of lithium and metals selected from the group consisting of Na, K, Rb, Cs, Fr, Be, Mg, Ca, Sr, Ba, Ra, Al and Sn.

In addition, the negative electrode may selectively further include a binder together with the negative electrode active material. The binder performs a role of making the negative electrode active material to a paste, mutual adhesion between the active materials, adhesion between the active material and a current collector, and having a buffering effect for active material expansion and contraction. Specifically, the binder is the same as described above.

In addition, the negative electrode may further include a current collector for supporting a negative electrode active layer including the negative electrode active material and the binder. The current collector may be selected from the group consisting of copper, aluminum, stainless steel, titanium, silver, palladium, nickel, alloys thereof and combinations thereof. The stainless steel may have its surface treated with carbon, nickel, titanium or silver, and as the alloy, aluminum-cadmium alloys may be used. In addition thereto, baked carbon, nonconductive polymers of which surface is treated with a conductor, conductive polymers or the like may also be used.

In addition, the negative electrode may be a thin film of lithium metal.

The separator uses a material separating or insulating the positive electrode and the negative electrode and allowing lithium ion transport therebetween, and is not particularly limited as long as it is commonly used as a separator in a lithium-sulfur battery, and those having an excellent electrolyte moisture-containing ability while having low resistance for ion migration of the electrolyte are particularly preferred.

More preferably, porous, non-conductive or insulating materials may be used as the separator material, and for example, an independent member such as a film, or a coating layer added to the positive electrode and/or the negative electrode may be used.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone, or as a laminate thereof, or common porous non-woven fabrics, for example, non-woven fabrics made of high melting point glass fiber, polyethylene terephthalate fiber or the like may be used, however, the separator is not limited thereto.

The electrolyte is a non-aqueous electrolyte containing a lithium salt, and is formed with a lithium salt and an electrolyte liquid. As the electrolyte liquid, a non-aqueous organic solvent, an organic solid electrolyte, an inorganic solid electrolyte and the like may be used.

The lithium salt is a material readily dissolved in the non-aqueous electrolyte, and examples thereof may include LiCl, LiBr, LiI, $LiClO_4$, $LiBF_4$, $LiB_{10}Cl_{10}$, LiB $(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, chloroborane lithium, lower aliphatic carboxylic acid lithium, lithium tetraphenylborate, imide and the like.

The concentration of the lithium salt may be from 0.2 M to 2 M, preferably from 0.6 M to 2 M and more preferably from 0.7 M to 1.7 M depending on various factors such as an accurate composition of the electrolyte mixture, solubility of the salt, conductivity of the dissolved salt, charge and discharge conditions of a battery, a working temperature, and other factors known in the lithium battery field. When the lithium salt concentration is less than the above-mentioned range, conductivity of the electrolyte may decrease causing decline in the electrolyte performance, and when greater than the above-mentioned range, viscosity of the electrolyte increases leading to a decrease in the lithium ion mobility, and therefore, a proper concentration is preferably selected in the above-described range.

The non-aqueous organic solvent may preferably include, as a material favorably dissolving the lithium salt, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethyl carbonate (DMC), diethyl carbonate (DEC), ethylmethyl carbonate (EMC), methylpropyl carbonate (MPC), ethylpropyl carbonate, dipropyl carbonate, butylethyl carbonate, ethyl propanoate (EP), toluene, xylene, dimethyl ether (DME), diethyl ether, triethylene glycol monomethyl ether (TEGME), diglyme, tetraglyme, hexamethyl phosphoric triamide, gamma-butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester and propionic acid ester, dimethylformamide, sulfolane (SL), methylsulfolane, dimethylacetamide, dimethyl sulfoxide, dimethyl sulfate, ethylene glycol diacetate, dimethyl sulfite or ethylene glycol sulfite, and these may be used either alone or in a mixed solvent form of two or more thereof.

As the organic solid electrolyte, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including ionic dissociation groups, and the like may be preferably used.

As the inorganic solid electrolyte of the present invention, nitrides, halides, sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO4$-$Li_2S$—$SiS_2$, and the like, may be preferably used.

The shape of the lithium-sulfur battery described above is not particularly limited, and examples thereof may include a jelly-roll type, a stack type, a stack-folding type (including stack-Z-folding type) or a lamination-stack type, and may preferably be a stack-folding type.

After preparing an electrode assembly having the positive electrode, the separator and the negative electrode consecutively laminated, the electrode assembly is placed in a battery case, the electrolyte liquid is injected to the top of the case, and the result is sealed with a cap plate and a gasket and then assembled to manufacture a lithium-sulfur battery.

The lithium-sulfur battery may be divided into a cylinder-type, a square-type, a coin-type, a pouch-type and the like depending on the shape, and may be divided into a bulk type and a thin film type depending on the size. Structures and manufacturing methods of these batteries are widely known in the art, and therefore, detailed descriptions thereon are not included.

When using Iron Oxide-hydroxide (FeOOH) prepared using the method for preparing Iron Oxide-hydroxide (FeOOH) as described above, for example, crystalline lepidocrocite (γ-FeOOH), in a lithium-sulfur battery, reactivity of the lithium-sulfur battery increases by adsorbing polysulfide eluted when charging and discharging the lithium-sulfur battery, and effects of enhancing discharge capacity and lifetime properties are obtained in the lithium-sulfur battery using the same.

Hereinafter, the present invention will be described in more detail with reference to examples and the like, however, the scope and the contents of the present invention may not be construed as being reduced or limited to the following examples and the like. In addition, when based on the disclosure of the present invention including the following examples, it is obvious that those skilled in the art may readily implement the present invention that is not specifically provided with experimental results, and such variations and modifications also belong to the attached claims.

EXAMPLE

[Preparation Example 1] Preparation of Iron Oxide-Hydroxide (FeOOH)

A 0.05 M aqueous $Fe(NO_3)_3 \cdot 9H_2O$ solution was mixed to a 0.3 M aqueous $NaBH_4$ solution for 50 seconds while stirring at 400 rpm. Herein, $NaBH_4$ was a product of TCI Co., Ltd. with purity of >95%, and $Fe(NO_3)_3 \cdot 9H_2O$ was a product of Aldrich with purity of 98%.

After the mixing, the result was reacted for 40 minutes at 24° C., filtered using a filter paper, and then dried for 8 hours at 80° C. to prepare Iron Oxide-hydroxide (FeOOH).

[Comparative Preparation Example 1] Preparation of Iron Oxide-Hydroxide (FeOOH)

Iron Oxide-hydroxide (FeOOH) was prepared in the same manner as in Preparation Example 1, except that the reaction time was 12 hours.

[Comparative Preparation Example 2] Preparation of Lepidocrocite (Korean Patent No. 10-0270077)

To an aqueous ferrous chloride solution (40 liters) with a concentration of 0.8 M/liter, an aqueous sodium hydroxide solution (10 liters) with a concentration of 1.6 M/liter was added to prepare ferrous hydroxide, and an oxidation reaction was carried out at a reaction temperature of 25° C. Herein, the seed crystal formation reaction was progressed while varying the oxidation rate of the ferrous hydroxide.

When the oxidation rate of the ferrous hydroxide is 0.15 mol/min or less, the reaction rate becomes low and goethite is incorporated thereto, and the ferrous hydroxide may become sludge without being oxidized. When the oxidation rate is 0.4 mol/min or greater, it becomes a fast oxidation reaction condition, and the grown lepidocrocite may be formed in an unstable particle phase and may be re-dissolved into $Fe^{2+}$ and $OH^-$.

[Example 1] Manufacture of Lithium-Sulfur Battery Including Iron Oxide-Hydroxide (FeOOH)-Added Positive Electrode First, with water as a solvent, 10 parts by weight of the Iron Oxide-hydroxide (FeOOH) was introduced and dissolved based on a total weight (100 parts by weight) of a base solid (active material, conductor and binder) to introduce the Iron Oxide-hydroxide (FeOOH) prepared in Preparation Example 1. After that, to the obtained solution, total 100 parts by weight of the base solid, that is, a sulfur-carbon composite (S/C 7:3) in 90 parts by weight as the active material, denka black in 5 parts by weight as the conductor, and styrene butadiene rubber/carboxymethylcellulose (SBR/CMC 7:3) in 5 parts by weight as the binder, was introduced, and the result was mixed to prepare a positive electrode slurry composition.

Subsequently, the prepared slurry composition was coated on a current collector (Al foil), and the result was dried for 12 hours at 50° C. to prepare a positive electrode. Herein, the loading amount was 3.5 $mAh/cm^2$ and the electrode porosity was 60%.

After that, a coin cell of a lithium-sulfur battery including the positive electrode prepared as above, a separator, a negative electrode and an electrolyte liquid was manufactured as follows. Specifically, the positive electrode was punched as a 14 phi circular electrode, and the polyethylene (PE) separator was punched as 19 phi, and as the negative electrode, 150 μm lithium metal was punched as 16 phi.

[Example 2] Manufacture of Lithium-Sulfur Battery Including Iron Oxide-Hydroxide (FeOOH)-Added Positive Electrode A coin cell of a lithium-sulfur battery was manufactured in the same manner as in Example 1 except that 5 parts by weight of the Iron Oxide-hydroxide (FeOOH) was introduced.

[Comparative Example 1] Manufacture of Lithium-Sulfur Battery Including Positive Electrode without Iron Oxide-Hydroxide (FeOOH) Addition With water as a solvent, total 100 parts by weight of a base solid, that is, a sulfur-carbon composite (S/C 7:3) in 90 parts by weight as the active material, denka black in 5 parts by weight as the conductor, and styrene butadiene rubber/carboxymethylcellulose (SBR/CMC 7:3) in 5 parts by weight as the binder, was introduced, and the result was mixed to prepare a positive electrode slurry composition.

Subsequently, the prepared slurry composition was coated on a current collector (Al foil), and the result was dried for 12 hours at 50° C. to prepare a positive electrode. Herein, the loading amount was 3.5 $mAh/cm^2$ and the electrode porosity was 60%.

After that, a coin cell of a lithium-sulfur battery including the positive electrode prepared as above, a separator, a negative electrode and an electrolyte liquid was manufactured as follows. Specifically, the positive electrode was punched as a 14 phi circular electrode, and the polyethylene (PE) separator was punched as 19 phi, and as the negative electrode, 150 μm lithium metal was punched as 16 phi.

[Comparative Example 2] Manufacture of Lithium-Sulfur Battery Including γ-FeOOH/Co-Added Positive Electrode A coin cell of a lithium-sulfur battery was manufactured in the same manner as in Example 1 except that γ-FeOOH/Co prepared by mixing $Fe(NO_3)_3/CoCl_2$ and $NaBH_4$ was used instead of Iron Oxide-hydroxide (FeOOH).

[Comparative Example 3] Manufacture of Lithium-Sulfur Battery Including $Fe(OH)_3$-Added Positive Electrode A coin cell of a lithium-sulfur battery was manufactured in the same manner as in Example 1 except that $Fe(OH)_3$ was used instead of Iron Oxide-hydroxide (FeOOH).

[Experimental Example 1] Scanning Electron Microscope (SEM) Analysis

A SEM analysis (S-4800 FE-SEM manufactured by Hitachi, Ltd.) was performed on lepidocrocite, the Iron Oxide-hydroxide (FeOOH) prepared in each of Preparation Example 1 and Comparative Preparation Example 1.

FIGS. 1 and 2 are SEM images of the lepidocrocite prepared in each of Preparation Example 1 and Comparative Preparation Example 1.

When referring to FIG. 1, in Preparation Example 1 having a reaction time of 40 minutes, plate-type lepidocrocite of a several hundred nm was observed when performing a SEM analysis with magnification of 50 k and 100 k each, however, in Comparative Preparation Example 1 having a reaction time of 12 hours, most of the plate-type structure disappeared.

[Experimental Example 2] XRD Analysis

An XRD Analysis (D4 Endeavor manufactured by Bruker) was performed on lepidocrocite, the Iron Oxide-hydroxide (FeOOH) prepared in each of Preparation Example 1 and Comparative Preparation Example 1.

FIG. 3 is a graph presenting an XRD analysis result for the lepidocrocite prepared in each of Preparation Example 1 and Comparative Preparation Example 1.

When referring to FIG. 3, it was seen that pure-phased crystalline lepidocrocite was prepared in Preparation Example 1.

In the lepidocrocite of Comparative Preparation Example 1, XRD peaks were identified to disappear, and it was seen that crystallinity mostly disappeared therefrom.

[Experimental Example 3] Comparative Experiment (1) on Lithium-Sulfur Battery Discharge Capacity Discharge capacity depending on the positive electrode material type was measured using the lithium-sulfur batteries manufactured in Examples 1 and 2, and Comparative Examples 1 to 3. The positive electrode of Example 1 included a sulfur-carbon composite and Iron Oxide-hydroxide (FeOOH) in 10 parts by weight, and the positive electrode of Example 2 included a sulfur-carbon composite and Iron Oxide-hydroxide (FeOOH) in 5 parts by weight. The positive electrode of Comparative Example 1 was employed to include a sulfur-carbon composite, the positive electrode of Comparative Example 2 was employed to include a sulfur-carbon composite and γ-FeOOH/Co in 10 parts by weight, and the positive electrode of Comparative Example 3 was employed to include a sulfur-carbon composite and $Fe(OH)_3$ in 10 parts by weight. Herein, the measurement current was 0.1 C, and the voltage range was from 1.8 V to 2.5 V.

Measured discharge capacity data are shown in Table 1 and FIG. 8.

TABLE 1

| | Lithium-Sulfur Battery | | Discharge Capacity (mAh/g) |
|---|---|---|---|
| | Negative Electrode | Positive Electrode | |
| Example 1 | Metal Lithium | Sulfur-Carbon Composite + FeOOH of Preparation Example 1 (10 Parts by Weight) | 1222 |
| Example 2 | Metal Lithium | Sulfur-Carbon Composite + FeOOH of Preparation Example 1 (5 Parts by Weight) | 1165 |
| Comparative Example 1 | Metal Lithium | Sulfur-Carbon Composite | 1073 |
| Comparative Example 2 | Metal Lithium | Sulfur-Carbon Composite + γ-FeOOH/Co (10 Parts by Weight) | 1160 |
| Comparative Example 3 | Metal Lithium | Sulfur-Carbon Composite + $Fe(OH)_3$ (10 Parts by Weight) | 1118 |

As shown in Table 1 and FIG. 8 based on the results, it was identified that the lithium-sulfur batteries of Examples 1 and 2 of the present invention containing Iron Oxide-hydroxide (FeOOH) had higher initial discharge capacity compared to Comparative Example 1 that did not contain Iron Oxide-hydroxide (FeOOH) in the positive electrode, Comparative Example 2 containing γ-FeOOH/Co and $Fe(OH)_3$, and Comparative Example 3 containing $Fe(OH)_3$. In addition, it was seen that Example 1 containing Iron Oxide-hydroxide (FeOOH) in 10 parts by weight had more increased battery discharge capacity compared to Example 2 containing in 5 parts by weight.

[Experimental Example 4] Comparative Experiment (2) on Lithium-Sulfur Battery Discharge Capacity In order to test discharge capacity of the lithium-sulfur battery depending on the positive electrode material type, a positive electrode and a negative electrode of the lithium-sulfur battery were formed as described in the following Table 2, and discharge capacity was measured.

The positive electrode of Comparative Experimental Example (1) included a sulfur-carbon composite, the positive electrode of Experimental Example (1) included a sulfur-carbon composite and the Iron Oxide-hydroxide (FeOOH) of Preparation Example 1, and the positive electrode of Experimental Example (2) included a sulfur-carbon composite and the Iron Oxide-hydroxide (FeOOH) of Comparative Preparation Example 1, and these were discharged at a rate of 0.1 C. The results are shown through Table 2 and FIG. 7.

TABLE 2

| | Lithium-Sulfur Battery | | Discharge |
| | Negative Electrode | Positive Electrode | Capacity (mAh/g) |
|---|---|---|---|
| Comparative Experimental Example (1) | Metal Lithium | Sulfur-Carbon Composite | 1,127 |
| Experimental Example (1) | Metal Lithium | Sulfur-Carbon Composite + Iron Oxide-hydroxide (FeOOH) of Preparation Example 1 | 1,200 |
| Experimental Example (2) | Metal Lithium | Sulfur-Carbon Composite + Iron Oxide-hydroxide (FeOOH) of Comparative Preparation Example 1 | 1,119 |

As shown in Table 2 and FIG. 7 based on the results, it was seen that Experimental Example (1) had increased discharge capacity compared to Comparative Experimental Example 1 and Experimental Example (2).

[Experimental Example 5] Comparative Experiment (1) on Lithium-Sulfur Battery Lifetime Properties Using the lithium-sulfur batteries according to Example 1, Example 2 and Comparative Example 1, change patterns in the discharge capacity according to a battery cycle and charge/discharge efficiency in 90 cycles were measured. Herein, initial charge/discharge was progressed with 0.1 C/0.1 C for 2.5 cycles, and with 0.5 C/0.3 C thereafter. In addition, the voltage range was from 1.8 V to 2.5 V.

Discharge capacity values measured as the battery cycle progressed were provided as a graph of FIG. 10.

When referring to FIG. 10, it was seen that the rate of discharge capacity decrease during the battery cycle progression was significantly small compared to Comparative Example 1 that did not contain Iron Oxide-hydroxide (FeOOH) in the positive electrode. In addition, the decrease in the discharge capacity was smaller as more Iron Oxide-hydroxide (FeOOH) was included, and it was identified that Comparative Example 1 had battery degeneration from the 60$^{th}$ cycle, whereas Example 1 had battery degeneration starting from the 70$^{th}$ cycle.

As a result, it was identified that the initial discharge capacity value was well maintained when containing Iron Oxide-hydroxide (FeOOH).

[Experimental Example 6] Experiment (2) on Lithium-Sulfur Battery Lifetime

In order to test lifetime properties of the lithium-sulfur battery depending on the positive electrode material type, a positive electrode and a negative electrode of the lithium-sulfur battery were formed as described in the following Table 3, and discharge capacity was measured.

The positive electrode of Comparative Experimental Example (1) included a sulfur-carbon composite, and the positive electrode of Experimental Example (1) included a sulfur-carbon composite and the Iron Oxide-hydroxide (FeOOH) of Preparation Example 1, and lifetime properties thereon were tested by repeating 2.5 cycles with 0.1 C, 3 cycles with 0.2 C and 10 cycles with 0.3 C/0.5 C. The results are shown in Table 3 and FIG. 9.

TABLE 3

| | Lithium-Sulfur Battery | | Discharge | Coulombic |
| | Negative Electrode | Positive Electrode | Capacity (mAh/g) | Efficiency (%) |
|---|---|---|---|---|
| Comparative Experimental Example (1) | Metal Lithium | Sulfur-Carbon Composite | 781 | 100.29 |
| Experimental Example (1) | Metal Lithium | Sulfur-carbon Composite + Iron Oxide-hydroxide (FeOOH) of Preparation Example 1 | 831 | 100.23 |

As shown in Table 3 and FIG. 9 based on the results, it was seen that Comparative Experimental Example (1) and Experimental Example (1) all exhibited a lifetime of 100 cycles, and Experimental Example (1) had higher discharge capacity compared to Comparative Experimental Example (1).

In addition, Coulombic efficiency indicating a ratio of charge capacity and discharge capacity was also maintained at 100%.

From such results, it was identified that, when adding the Iron Oxide-hydroxide (FeOOH) prepared in Preparation Example 1 to a positive electrode of a lithium-sulfur battery, lifetime inhibiting factors are not present while having an excellent discharge capacity effect.

[Experimental Example 7] Experiment on Polysulfide Adsorption Capability of Iron Oxide-Hydroxide (FeOOH)

Lithium polysulfide adsorption capability of the Iron Oxide-hydroxide (FeOOH) prepared in Preparation Example 1 was identified through a result of ultraviolet (UV, Agilent 8453 UV-visible spectrophotometer manufactured by Agilent) absorbance and a visual comparative experimental result, and the results are shown in FIG. 5 and FIG. 6.

First, as shown in FIG. 6, it was identified that ultraviolet absorbance intensity decreased by the Iron Oxide-hydroxide (FeOOH) adsorbing lithium polysulfide in a wavelength range of 200 nm to 1000 nm.

In addition, as shown in FIG. 5, it was identified that red color of lithium polysulfide (FIG. 5, blank) reacting with the Iron Oxide-hydroxide (FeOOH) became pale when visually identifying lithium polysulfide adsorption capability through changes in the chromaticity, and it was seen that lithium polysulfide adsorption ability of the Iron Oxide-hydroxide (FeOOH) was excellent.

The invention claimed is:
1. A method for preparing Iron Oxide-hydroxide (FeOOH) comprising
mixing and reacting $Fe(NO_3)_3 \cdot 9H_2O$; and a reducing agent represented by the following Chemical Formula 1:

$$M^1(BH_4)_X \quad \text{[Chemical Formula 1]}$$

wherein, in Chemical Formula 1,
$M^1$ is any one selected from among Li, Na, Mg, K and Ca; and
X is 1 or 2.

2. The method for preparing Iron Oxide-hydroxide (FeOOH) of claim 1, wherein the $Fe(NO_3)_3 \cdot 9H_2O$ is present as an aqueous solution having a concentration of 0.04 M to 0.08 M.

3. The method for preparing Iron Oxide-hydroxide (FeOOH) of claim 1, wherein the reducing agent represented by Chemical Formula 1 is present as an aqueous solution having a concentration of 0.2 M to 0.5 M.

4. The method for preparing Iron Oxide-hydroxide (FeOOH) of claim 1, wherein the mixing is carried out for 10 seconds to 120 seconds.

5. The method for preparing Iron Oxide-hydroxide (FeOOH) of claim 1, wherein the reacting is carried out at a temperature of from 20° C. to 25° C.

6. The method for preparing Iron Oxide-hydroxide (FeOOH) of claim 1, wherein the reaction time is from 40 minutes to 2 hours.

7. The method for preparing Iron Oxide-hydroxide (FeOOH) of claim 1, further comprising filtering and drying after the reacting.

8. The method for preparing Iron Oxide-hydroxide (FeOOH) of claim 1, wherein the Iron Oxide-hydroxide (FeOOH) is lepidocrocite ($\gamma$-FeOOH).

9. The method for preparing Iron Oxide-hydroxide (FeOOH) of claim 1, wherein the Iron Oxide-hydroxide (FeOOH) is crystalline.

10. The method for preparing Iron Oxide-hydroxide (FeOOH) of claim 1, wherein the Iron Oxide-hydroxide (FeOOH) has a plate-type crystalline structure.

11. The method for preparing Iron Oxide-hydroxide (FeOOH) of claim 1, wherein the Iron Oxide-hydroxide (FeOOH) has a particle diameter of 50 nm to 500 nm.

12. A positive electrode for a lithium-sulfur battery comprising:
   a sulfur-carbon composite as an active material;
   a conductor; and
   a binder,
   wherein the positive electrode includes lepidocrocite ($\gamma$-FeOOH), prepared according to the process of claim 1,
   wherein the lepidocrocite ($\gamma$-FeOOH) has XRD peaks of (200), (210), (301) and (020) surfaces appearing at $2\theta=14.1\pm0.1°$, $27.0\pm0.1°$, $36.3\pm0.1°$ and $46.9\pm0.1°$, respectively.

13. The positive electrode for a lithium-sulfur battery of claim 12, wherein the lepidocrocite ($\gamma$-FeOOH) has a plate-type crystalline structure.

14. The positive electrode for a lithium-sulfur battery of claim 12, wherein the lepidocrocite ($\gamma$-FeOOH) has an average particle diameter of 50 nm to 500 nm.

15. The positive electrode for a lithium-sulfur battery of claim 12 comprising the lepidocrocite ($\gamma$-FeOOH) in 0.1 parts by weight to 15 parts by weight with respect to 100 parts by weight of the sum of the active material, the conductor and the binder.

16. A lithium-sulfur battery comprising;
   a positive electrode;
   a negative electrode;
   a separator and an electrolyte provided therebetween,
   wherein the positive electrode is the positive electrode for a lithium-sulfur battery according to claim 12.

* * * * *